(12) United States Patent
Seiler et al.

(10) Patent No.: US 8,344,880 B2
(45) Date of Patent: Jan. 1, 2013

(54) FIELD DEVICE OF AUTOMATION TECHNOLOGY

(75) Inventors: Christian Seiler, Auggen (DE); Marc Fiedler, Reinach (CH)

(73) Assignee: Endress + Hauser Process Solutions AG, Reinach (CH)

( * ) Notice: Subject to any disclaimer, the term of this patent is extended or adjusted under 35 U.S.C. 154(b) by 311 days.

(21) Appl. No.: 12/654,279

(22) Filed: Dec. 16, 2009

(65) Prior Publication Data

US 2010/0161081 A1  Jun. 24, 2010

(30) Foreign Application Priority Data

Dec. 18, 2008 (EP) .................................. 08172193

(51) Int. Cl.
  *G08B 1/08* (2006.01)

(52) U.S. Cl. ............. 340/539.3; 340/539.1; 340/539.31; 340/539.32; 713/320; 713/321; 713/322; 713/323; 713/324; 455/572; 455/574; 700/12; 700/16

(58) Field of Classification Search ............... 340/539.1, 340/539.31, 539.32, 539.3, 500; 713/320–324; 455/572, 574; 700/12, 16
See application file for complete search history.

(56) References Cited

U.S. PATENT DOCUMENTS

| | | | | |
|---|---|---|---|---|
| 2008/0273486 A1* | 11/2008 | Pratt et al. | ...................... | 370/328 |
| 2008/0273518 A1* | 11/2008 | Pratt et al. | ...................... | 370/345 |
| 2008/0274772 A1* | 11/2008 | Nelson et al. | ................. | 455/572 |
| 2008/0291009 A1* | 11/2008 | Nelson et al. | .............. | 340/539.3 |

FOREIGN PATENT DOCUMENTS

WO   WO 2008/127657 A1   10/2008

OTHER PUBLICATIONS

Hasegawa, Yoshio and Teranishi, Yoshikazu, Fieldbus Communication Interface IC, Yokogawa Technical Report English Edition, 999, No. 27, pp. 5-8.*

* cited by examiner

*Primary Examiner* — George A. Bugg
*Assistant Examiner* — Sisay Yacob
(74) *Attorney, Agent, or Firm* — Bacon & Thomas, PLLC

(57) ABSTRACT

A field device of automation technology, is fed via a two-wire line or via an energy source of limited energy reserve associated with the field device. The field device includes: a hardwired communication interface having at least one communication channel; and, associated with the communication interface, a functional unit, which is embodied in such a manner, that it performs sending and/or receiving of digital communication signals via the communication interface. The functional unit, for the purpose of energy saving, is turned on only in active, operating phases, while it is switched off in inactive, resting phases; and a detection circuit is provided, which detects a communication signal applied to the communication interface and automatically activates the functional unit.

9 Claims, 3 Drawing Sheets

Fig. 2a
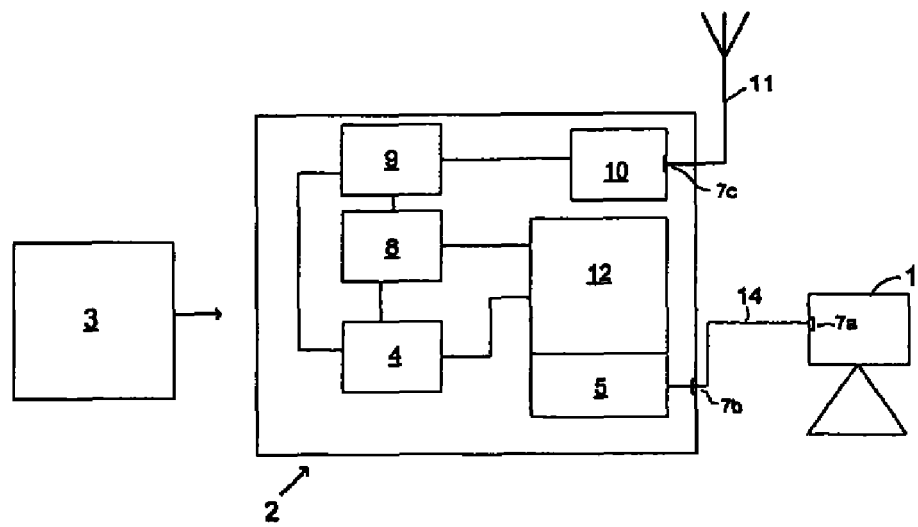
Fig. 2a
Fig 2b
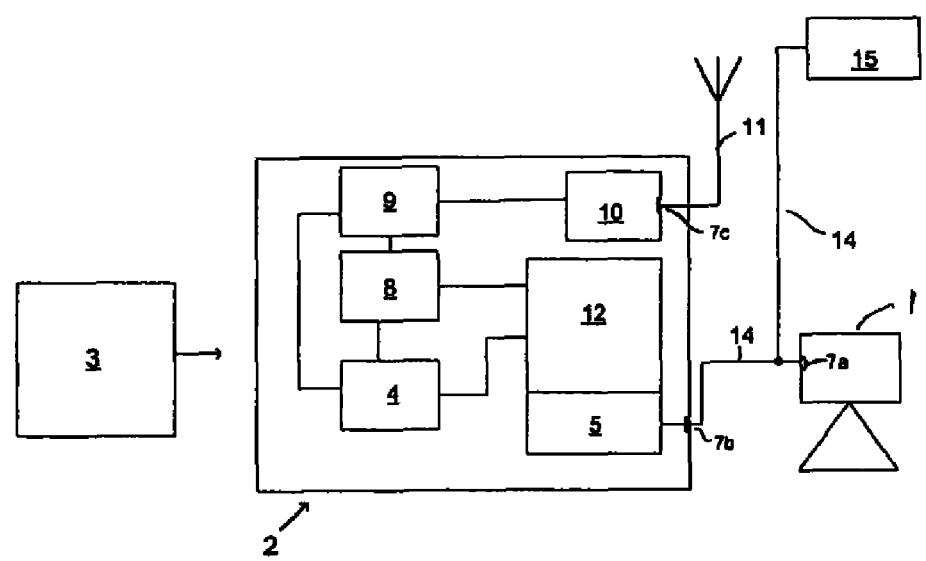

FIELD DEVICE OF AUTOMATION TECHNOLOGY

TECHNICAL FIELD

The invention relates to a field device of automation technology, which is fed via a two-wire line or by an energy source of limited energy reserve associated with the field device. The field device includes: A hardwired communication interface having at least one communication channel; and, associated with the communication interface, a functional unit, which is embodied in such a manner, that it performs sending and/or receiving of digital communication signals via the communication interface.

BACKGROUND DISCUSSION

In process automation technology as well as in manufacturing automation technology, field devices are often applied, which serve for registering, and/or influencing, process variables. Serving for registering process variables are measuring devices, or sensors, such as, for example, fill level measuring devices, flow measuring devices, pressure, and temperature, measuring devices, pH, and redox potential, measuring devices, conductivity measuring devices, etc., which register the corresponding process variables, fill level, flow, pressure, temperature, pH-value, or conductivity. Serving for influencing process variables are actuators, such as, for example, valves or pumps, via which the flow a liquid in a pipeline section, or the fill level in a container, can be changed.

Classified as field devices are, in principle, all devices, which are applied near to the process and which deliver, or process, process-relevant information. Besides the aforementioned measuring devices/sensors and actuators, also classified as field devices are, generally, also units, which are connected directly to a fieldbus and serve for communication with superordinated units. Thus, also classified as field devices are e.g. remote I/Os, gateways, linking devices and wireless adapters. A large number of such field devices are produced and sold by the Endress+Hauser Group.

In modern industrial plants, field devices are, as a rule, connected with superordinated units via fieldbus systems, such as e.g. Profibus®, Foundation Fieldbus®, HART®, etc. Normally, the superordinated units include control systems, or control units, such as, for example, a PLC (programmable logic controller). The superordinated units serve, among other things, for process control, process visualizing, and process monitoring, as well as for start-up of the field devices. The measured values registered by the field devices, especially by sensors, are transmitted via the connected bus system to one, or, in given cases, also to a number of superordinated unit(s). Along with that, also data transmission from the superordinated unit via the bus system to the field devices is required; this serves, especially, for the configuring and parametering of field devices or for diagnostic purposes. In general, the field device is serviced via the bus system from the superordinated unit.

Besides hardwired data transmission between the field devices and the superordinated unit, there is also the opportunity for radio, or wireless, data transmission. Especially in the bus systems, Profibus®, Foundation Fieldbus® and HART®, wireless data transmission via radio is provided for. Additionally, radio, or wireless, networks for sensors are specified in greater detail in the standard IEEE 802.15.4.

For implementing wireless data transmission, newer field devices, especially sensors and actuators, are embodied, in part, as radio field devices. These include, as a rule, a radio unit and an electrical current source as integral components. In such case, the radio unit and the electrical current source can be provided even in the field device or in a radio module connected durably to the field device. Through the electrical current source, a self-sufficient energy supply of the field device is enabled.

Along with that, there is the opportunity to transform field devices without radio units—thus the installed base—into a radio field device by coupling such with, in each case, a wireless adapter, which has a radio unit. A corresponding wireless adapter is described, for example, in the publication WO 2005/103851 A1. The wireless adapter is, as a rule, releasably connected to a fieldbus communication interface of the field device. Via the fieldbus communication interface, the field device can send the data to be transmitted via the bus system to the wireless adapter, which then transmits the data via radio to the desired location. Conversely, the wireless adapter can receive data via radio and forward such via the fieldbus communication interface to the field device. The supplying of the field device with electrical power occurs then, as a rule, via an energy supply unit of the wireless adapter.

In the case of autarkic radio field devices with or without wireless adapter, communication, for example, with a superordinated unit is conducted, as a rule, via the wireless communication interface of the radio field device, or via the wireless adapter, as the case may be. Additionally, such radio field devices, or wireless adapters, have, as a rule, a hardwired communication interface. For example, it is provided in the HART® standard that radio field devices must have, besides a wireless interface, also a hardwired communication interface. Via such a hardwired communication interface, for example, on-site configuration of the radio field device, or of the wireless adapter, is possible via a service unit, such as, for example, a handheld communicator, which is connected to the hardwired communication interface. Additionally, the hardwired communication interface can be embodied as a fieldbus communication interface, so that communication thereover is conducted corresponding to a bus system, such as, for example, corresponding to one of the standardized bus systems, Profibus®, Foundation Fieldbus® or HART®. Via such a fieldbus communication interface, the radio field device, or the wireless adapter, can also be connected to a corresponding hardwired fieldbus. The energy supply unit, or the electrical current source, of wireless adapters, or of a radio field device, is usually a onetime use battery or a rechargeable battery.

In the case of field devices, for which only a limited energy reserve is available, it must be heeded, that no energy is consumed unnecessarily. An effective method for energy saving in the case of two wire, or radio, field devices is to provide the field devices with the ability to move between two operating phases, an active phase and a resting phase. During the resting phase, the energy supply to the individual system components is reduced, or the components are turned off. Often, one speaks, in this connection, of switching the field devices into a sleep mode.

The large part of the installed base of field devices today are HART devices, thus field devices, which communicate via the HART standard with a superordinated control unit. These field devices must be able, at any time, to react to communication requests of the control unit. Such communication requests occur, for example, in the case of a configuring or parametering of the field device or in the case of the sending off of a control command to the field device, or the control unit asks for a measured value query from the field device, in order to obtain information concerning the present measured value. Of course, the configuring of the field device, comparatively speaking, does not occur very often. Depending on application, the measured value query likewise occurs relatively greatly spaced in time. If the field device would, despite the sporadic communication requests, keep the communication relevant components continually supplied with energy and ready, then, a large part of the time, energy would be wasted. In the case of e.g. battery operated field devices, or field devices, for which only a limited amount of energy is available via a two-wire line, such a waste of energy is not acceptable. In the case of a supplying of the field device from a onetime use battery, battery life declines. In the case of a two wire supply, the energy used for the continual communication readiness cannot be used by the other components of the field device.

SUMMARY OF THE INVENTION

An object of the invention is to minimize energy requirement despite maintaining continual communication readiness of the field device.

The object is achieved by the features that the functional unit, for the purpose of energy saving, is turned on only in active, operating phases, while it is switched off in resting phases. According to the invention, a detection circuit is provided, which detects a communication signal applied to the communication interface and then automatically activates the functional unit. In this way, it is achieved, that, automatically, always then—and only then—, when a communication signal is detected at the communication interface, is there a switching from the sleep mode (resting phase) into the operating mode. If, in the switched on state, there is no communication signal more on the communication interface, then the functional unit switches the communication relevant components back into the sleep mode. The loading of the energy supply unit of limited energy reserve—thus, in such case, a onetime use battery, a rechargeable battery or a fuel cell—is significantly reduced by means of the field device of the invention. As a result, the life of the onetime use battery is lengthened. Especially, all non-required, electric current consuming components of the field device are turned off or switched into a sleep mode. Especially, this holds also for components required for communication, thus the microprocessor, the HART modem, etc.

In an advantageous embodiment of the field device of the invention, the communication interface is a fieldbus interface embodied according to one of the communication standards used in automation technology. Standards established in automation technology are based on the HART, Profibus or Foundation Fieldbus protocol.

Especially advantageous in connection with the field device of the invention is when the detection circuit has a high resistancely coupled, comparator circuit, which monitors the communication channel for electrical current, and/or voltage, modulations. In such case, the electrical current, and/or voltage, modulations are an unequivocal sign for the fact that a communication signal is present on the communication channel. A high resistancely coupled, comparator circuit monitors, with very little energy requirement, the at least one communication channel for occurring electrical current, or voltage, modulations. According to the invention, in the case of detection of electrical current, or voltage, modulations on the communication channel, the communication relevant components in the sleep mode are activated, especially, the microprocessor is immediately awakened. The short delay occurring through the waking up is insignificant, since, before each communication telegram, according to standard, a preamble is sent and the field device becomes, within this phase, communication ready.

Preferably, the comparator circuit includes a low energy, or low power, comparator with open-drain output, which, in the case of occurrence of a communication signal, produces a positive-negative edge, which switches a microprocessor associated with the communication circuit active, so that the next operational phase is activated. In order to minimize the energy requirement of the detection circuit, low-power comparators, so-called nanopower comparators with open-drain output, are used. These are so embodied, that an electrical current, on the basis of the battery, or the energy supply, only flows on the output of the comparator, when also, in fact, a communication signal, especially a HART communication signal, is detected. In this case, the output of the comparator switches to ground.

Furthermore, it is provided, that there is placed in front of the comparator circuit a filter, which so is designed, that essentially only communication signals freed of disturbance signals are passed through to the comparator circuit. Especially advantageous is when the filter is a lowpass, which, in the case of a communication signal corresponding to the HART communication specification, passes frequencies from 2200 Hz on down. Through the passive filter, the disturbance susceptibility of the detection circuit as regards high-frequency disturbance signals is strongly limited. Through the filter, a reaction of the detection circuit is limited to communication signals, which lie in the frequency range e.g. typical for HART communication signals, up to 2200 Hz. If a communication signal is detected on the communication channel, then the detection circuit generates a positive-negative edge. This triggers an interrupt on the microprocessor and 'wakes' the system, preferably the microprocessor.

An advantageous embodiment of the field device of the invention provides that an attenuation member is placed in front of the filter, or in front of the lowpass. The attenuation member is so designed, that only a reduced part of the communication signal reaches a first input of the comparator circuit as input electrical current, while the difference portion of the communication signal is forwarded to the communication circuit.

Furthermore, it is provided that a wireless communication interface embodied according to one of the communication standards used in automation technology is associated with the field device.

Alternatively, it is provided that, associated with the wireless communication interface is a radio adapter, through which a conventional field device is transformed into a self-sufficient, radio, field device. Furthermore, it is provided that, in the case of a radio field device or of a field device with a radio adapter, a radio unit and an energy source are integrated into the field device, or into the radio adapter, as the case may be.

BRIEF DESCRIPTION OF THE DRAWINGS

The invention will now be explained in greater detail on the basis of the drawing, the figures of which show as follows:

FIG. 2*a* is a block diagram of a first embodiment of the field device of the invention;

FIG. 2*b* is a block diagram of a second embodiment of the field device of the invention.

DETAILED DISCUSSION IN CONJUNCTION WITH THE DRAWINGS

Figure 1:
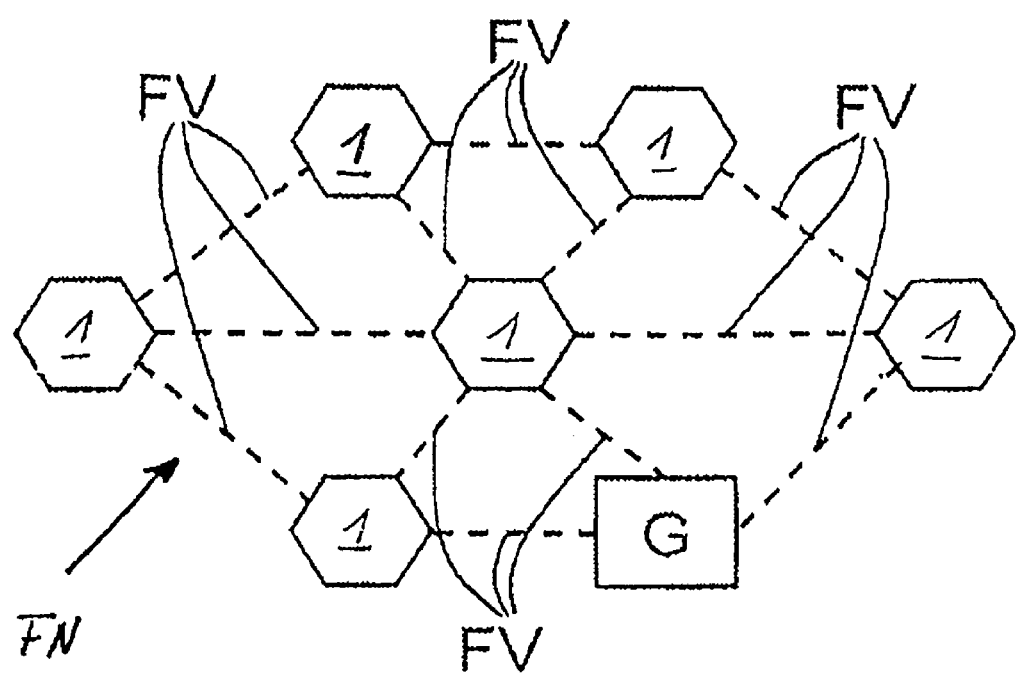
FIG. 1 is a schematic drawing of a radio network having a plurality of field devices.

FIG. 1 shows a radio network having: A plurality of field devices 1, each of which is embodied as a radio field device; and a gateway G. The field devices 1 are connected together and with the gateway G, in each case, by radio connections FV, as indicated in FIG. 1 by the dashed lines. Because the field devices 1 and the gateway G are, in each case, connected redundantly via a number of radio connections FV, even in the case of a failure of one of the radio connections FV, communication can still be maintained via one of the other radio connections FV.

Suitable as radio transmission technologies for the radio connections FV involve methods such as, for example, frequency hopping spread spectrum (FHSS) or direct sequence spread spectrum (DSSS). Due to the required small transmission powers, also ultra wide band technology (UWB) is very well suited.

Gateway G can be a long distance transmission unit, e.g. the "Fieldgate" product of the firm, Endress+Hauser. In this case, gateway G can communicate worldwide with a superordinated unit, for example, via Internet, GSM or the public switched telephone network. Additionally, a superordinated unit (not shown) and/or a servicing device (not shown) can also communicate directly via a corresponding radio connection with the illustrated radio network.

Shown in FIGS. 2a and 2b are schematic representations of two preferred embodiments of a field device 1, each of which has been transformed by means of a wireless adapter 2 into a radio field device. Field device 1 is composed of a measured value transducer, or sensor, 15 and a measurement transmitter 16. Field device 1 can—such as already discussed earlier at length—be designed for determining and/or influencing any desired process variables.

Arranged in the radio adapter 2 are different components, preferably on a board. Via the connecting lines 14, the radio adapter 2 is in connection with the field device 1. Further provided are: a unit 4 for voltage conversion; and a communication module 8 (or a communication interface 8). The voltage conversion unit 4 is connected with the communication module 8 and the microprocessor 9.

Field device 1 and wireless adapter 2 are connected with one another for communication. In the case of the hardwired communication interface 7a, 7b, such involves, preferably, a HART® communication interface. Associated with communication interface 7a, 7b is a functional unit 12, which performs the sending and/or receiving of digital signals—(e.g. corresponding to the HART® standard) via the communication interface 7a. Via the communication interface 7a, the field device 1 can also—alternatively to the illustrated connection to the wireless adapter 2—be connected to a hardwired, fieldbus system of a type conventional in automation technology, e.g. a HART®-fieldbus system.

Arranged in the immediate vicinity of the communication interface 7b and the functional unit 12 is the detection unit 5. This is explained in detail in connection with FIG. 3. The wireless adapter 2 includes, such as already mentioned, a control unit in the form of a microprocessor 9. For data exchange via the radio network FN, the microprocessor 9 is connected with a radio unit 10, which has an RF chipset and an antenna 11, is connected by a communication interface 7c. The radio unit 10 is, in such case, embodied in such a manner, that the wireless communication occurs according to one of the standards customary in automation technology, preferably according to the HART® standard. The microprocessor 9 is additionally connected with a data memory (not separately illustrated), in which, among other things, parameters of the wireless adapter 2 are stored. For communication with the field device 1, the wireless adapter 2 includes a hardwired communication interface 7b, which, in turn, is associated with a functional unit, which performs the sending and/or receiving of digital signals via the communication interface 7b.

In the case of the arrangements illustrated in the figures, the communication interface 7a of the field device 1 and the communication interface 7b of the wireless adapter 2 are connected with one another via a 2-conductor connecting line 14. Via this connection occur both the communication between the field device 1 and the wireless adapter 2 as well as also the electrical current supply of the field device 1 through the wireless adapter 2.

For the purpose of providing the electrical current supply of the field device 1 and the wireless adapter 2, an energy supply unit 3 is associated with the wireless adapter 2. The energy supply unit 3 is able to supply the field device 1, or the radio adapter 2 and the field device 1, with limited energy. The energy supply unit 3 is e.g. a onetime use battery, a rechargeable battery, a solar panel or a fuel cell. The field device 1 and the here illustrated radio adapter 2 with field device 1 are, thus, respectively, energy autarkic units.

FIGS. 2a and 2b show cases, in which the radio module 10 is integrated into a radio adapter 2. Through connection of the radio, or wireless, adapter 2 to the conventional field device 1, the field device 1 can be transformed into a radio field device. The field device 1 is, in such case, fed by means of the energy source 3 (FIG. 2a) or draws its energy from another source, for example a power supply 15 (FIG. 2b). Of course, the radio module 10 can also be integrated directly into the field device 1. Furthermore, the field device can be connected via the communication interface 7a directly to a fieldbus, which works e.g. corresponding to the HART standard. In this case, the detection circuit 5 is associated with the communication interface 7a of the field device 1. Of course, in such case, a corresponding field device 1 can also be equipped without a radio module. Then, the circuit helps, in such case, to optimize the energy budget.

Figure 3:
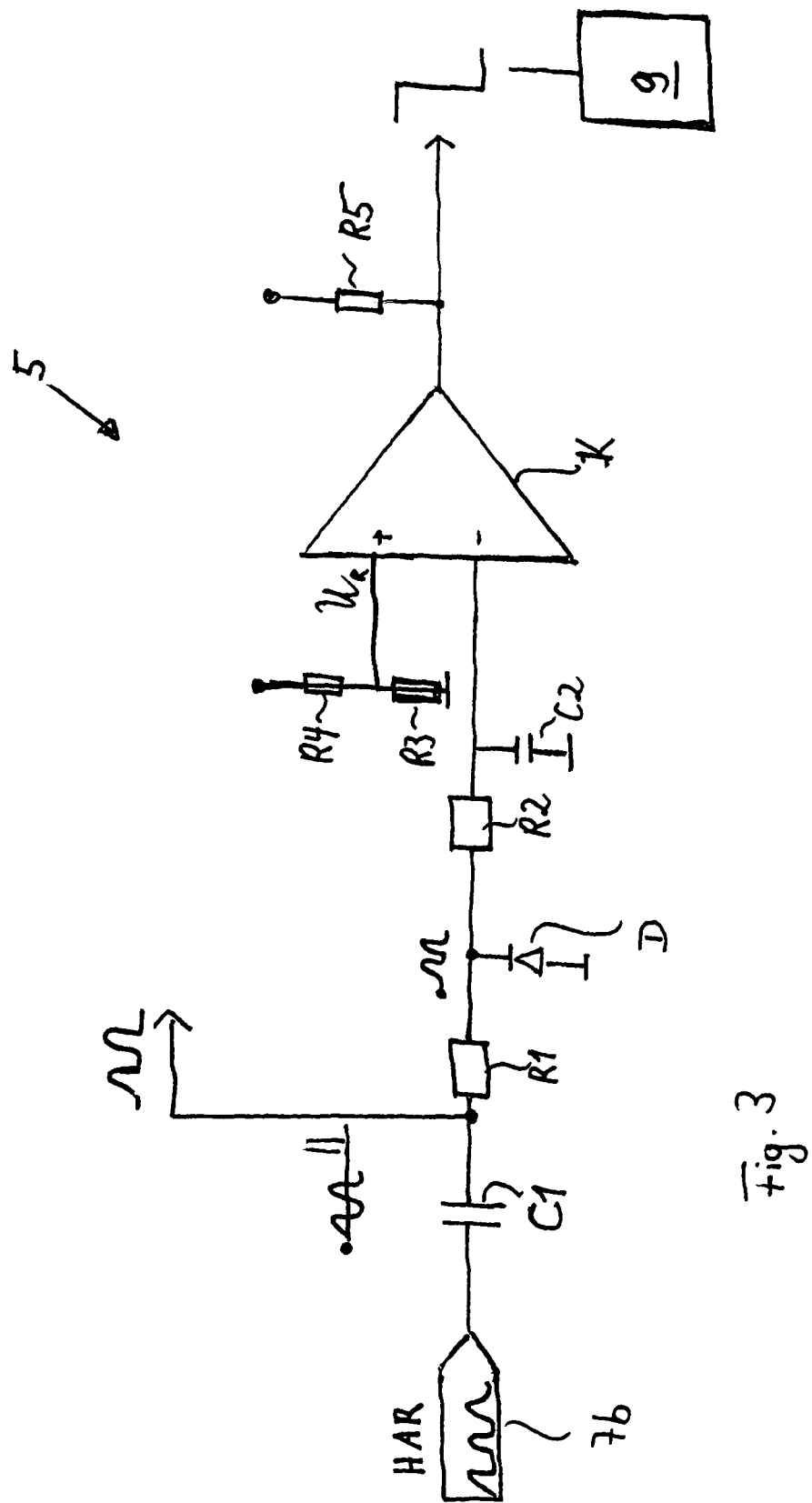
FIG. 3 is a block diagram showing a preferred embodiment of the detection circuit of the field device of the invention.

FIG. 3 shows a block diagram of a preferred embodiment of detection circuit 5 of the field device of the invention 1. An incoming HART communication signal is introduced via an attenuation unit, formed by the capacitor C1 and the resistor R1. In this way, it is achieved, that only a small fraction of the incoming HART signal is used for activating, or deactivating, the detection circuit 5; the larger part of the communication signal is coupled out and used further for analysis of its content.

By means of the diode D, the negative half-wave is coupled out of the communication signal. Via the low-pass filter, formed from R2 and C2, the communication signal is freed of high-frequency, disturbance signals. Then, the cleaned communication signal arrives at the minus input of the comparator circuit K, on whose plus input lies the reference voltage $U_R$. The size of the reference voltage $U_R$ is established via the voltage divider formed by R3 and R4.

A wireless adapter can have a number of communication channels. For instance, then the HART detection circuit must be doubly designed, so that it monitors each of two communication channels for a communication signal.

In the case of a communication on one of the communication channels, interrupts on the microprocessor 9 are triggered. Thus, in each case, the communication channel, on which the communication is taking place, can be identified. The microprocessor 9 then controls the turning on and off of the components needed for communication.

According to the invention, thus, a very energy saving autodetection of a communication signal transmitted on a communication channel is possible. The detection of an incoming communication signal leads subsequently automatically to the fact that components of the communication circuit and/or the field device 1, or the wireless adapter 2, lying in the sleep mode are immediately activated. Usually occurring first is the activating of the microprocessor 9, which subsequently activates the required system components.

The invention claimed is:

1. A field device of automation technology, which is fed via a two-wire line or via an energy source of limited energy reserve associated with the field device, comprising:
   a hardwired communication interface having at least one communication channel;
   a functional unit associated with the hardwired communication interface which is embodied in such a manner, that it performs sending and/or receiving of digital communication signals via said hardwired communication interface, said functional unit, for the purpose of energy saving, is turned on only in active, operating phases, while it is switched off in inactive, resting phases; and
   a detection circuit, which detects a communication signal applied to said hardwired communication interface and automatically activates said functional unit, wherein:
   said detection circuit includes a high resistance coupled comparator circuit, which monitors the communication channel for electrical current, and/or voltage, modulations, which indicate a communication signal; and
   said high resistance coupled comparator circuit includes a low energy, or low power, comparator with open-drain output, which, in the case of occurrence of a communication signal, produces a positive-negative edge, which switches a microprocessor associated with said communication circuit active, so that the operational phase is activated.

2. The field device as claimed in claim 1, wherein:
   said communication interface is a fieldbus interface, which is embodied according to communication standards used in automation technology.

3. The field device as claimed in claim 1, wherein:
   a filter is placed in front of said high resistance coupled comparator circuit, said filter is so designed, that essentially only communication signals freed of disturbance signals are passed through to said comparator circuit.

4. The field device as claimed in claim 1, wherein:
   said filter is a lowpass filter, which, in the case of a communication signal corresponding to the HART communication specification, passes frequencies from 2200 Hz on down.

5. The field device as claimed in claim 1, wherein:
   in the case of a radio field device or a field device with a radio adapter, a radio unit and the energy source are integrated into the field device, or into the radio adapter.

6. The field device as claimed in claim 1, wherein:
   the energy source is one of: a onetime use battery, a rechargeable battery and a fuel cell.

7. A field device of automation technology, which is fed via a two-wire line or via an energy source of limited energy reserve associated with the field device, comprising:
   a hardwired communication interface having at least one communication channel;
   a functional unit associated with the hardwired communication interface which is embodied in such a manner, that it performs sending and/or receiving of digital communication signals via said hardwired communication interface, said functional unit, for the purpose of energy saving, is turned on only in active, operating phases, while it is switched off in inactive, resting phases; and
   a detection circuit, which detects a communication signal applied to said hardwired communication interface and automatically activates said functional unit, wherein:
   a filter is placed in front of a comparator circuit, said filter is so designed, that essentially only communication signals freed of disturbance signals are passed through to said comparator circuit; and
   an attenuation member is placed in front of said filter, said attenuation member so is designed, that only a reduced part of the Communication signal reaches a first input of said comparator circuit as input electrical current, while a difference portion of the communication signal goes to said hardwired communication circuit.

8. The field device as claimed in claim 7, further comprising:
   a wireless communication interface associated with said field device, said wireless communication interface is embodied according to a communication standard used in automation technology.

9. The field device as claimed in claim 8, further comprising:
   a radio adapter associated with said wireless communication interface, through which a conventional field device is transformed into a self-sufficient, radio, field device.

* * * * *